United States Patent Office 3,470,115
Patented Sept. 30, 1969

3,470,115
PROCESS FOR MAKING NON-SHRINKING UREA-FORMALDEHYDE FOAMS
William P. Moore, Jr., Chester, and Rob. R. MacGregor, Hopewell, Va., assignors to Allied Chemical Corporation, New York, N.Y., a corporation of New York
No Drawing. Filed Aug. 27, 1965, Ser. No. 483,347
Int. Cl. C08g 53/08, 5/00
U.S. Cl. 260—2.5
2 Claims

ABSTRACT OF THE DISCLOSURE

Process of producing a substantially non-shrinking urea-formaldehyde foam which comprises preparing an aqueous urea-formaldehyde resin solution, flash drying said solution, and redissolving said dried resin in water, adding a hardener solution and foaming agent to said resins solution, forcing air through said resin solution to produce a homogeneous foam and curing the foam.

---

This invention relates to stable urea-formaldehyde resins, and more particularly to a process whereby these resins are used to prepare urea-formaldehyde insulating foams having substantially non-shrinking properties when cured and dried.

Resinous foams prepared from aqueous urea-formaldehyde solutions hardened and cured by an acidic hardening agent followed by curing and drying are known. Since urea-formaldehyde foams are useful for insulating purposes and may be deposited immediately upon preparation of the foam into the structures to be insulated, for example, into cavities in the walls and ceilings of homes and other structures, they should be substantially non-shrinking when cured and dried.

It is a distinct disadvantage of these conventionally prepared urea-formaldehyde foams that during the curing and drying process they undergo excessive shrinkage, often suffering a linear shrinkage of 10% or more. Thus, inferior insulation is produced which on curing and drying no longer fills the wall and ceiling cavities completely, but, consequently, leaves non-insulating voids throughout the treated areas of the structure.

Copending U.S. application Serial No. 317,078, filed Oct. 17, 1963, by Wells and Justice, assigned to the assignee herein discloses that the addition of polyethylene glycol to a urea-formaldehyde resin will reduce, to a limited extent, linear shrinkage of the foam produced therefrom. Another copending U.S. application, Serial No. 351,864, filed Mar. 13, 1964, by Mason also assigned to the assignee herein, discloses the addition of furfuryl alcohol to a polyethylene glycol containing urea-formaldehyde resin solution, which renders the foam produced therefrom flame-retardant as well as showing limited reduction in linear shrinkage as above indicated. These above-mentioned disclosed resin solutions, as well as the others known to the prior art, possess the serious disadvantage of rather short storage stability, as measured by viscosity increase, and, as already indicated, the foams produced therefrom exhibit marked decrease in volume upon curing and drying.

It is therefore an object of this invention to provide a stable urea-formaldehyde resin, and a quick process for preparing it.

It is another object of this invention to provide a stable, substantially non-shrinking urea-formaldehyde foam and a process for preparing it.

These and other objects will flow from and become apparent from the following description of the invention.

In accordance with this invention it has been discovered that a stable dry urea-formaldehyde resin is produced when an aqueous urea-formaldehyde resin is quick-dried in periods less than one minute at solids temperatures below 130° C. A dried resin prepared in this manner may be stored for periods of at least six months, and is readily reconstituted into an aqueous resin solution by dissolving the dried resin in water. Surprisingly, the dried resin is of such stability that the viscosity of the aqueous solution prepared therefrom remains virtually unchanged as compared to the original initial viscosity of the undried resin solution. Even more surprising is the fact that the dried resin of this invention produces a urea-formaldehyde foam having substantially non-shrinking properties when cured and dried.

It has not yet been discovered why the quick drying process of this invention provides such a stable resin, which in turn produces a non-shrinking foam. It has been postulated that perhaps a part of the methylol urea compounds in the original aqueous resin are converted to urons by a cyclization process, but this has not been, as yet, proven. All that is known at this point is that the quick dried resin of this invention has the surprising properties as above described.

In carrying out the process according to this invention a urea-formaldehyde solution is prepared in a conventional manner having a solid content between about 45% and about 65% and a mol ratio of formaldehyde to urea between about 1.4 and about 2.2. The viscosity of the resin ranges from about 15 to 150 centipoises at 25° C.

In the preferred process the resin solution is prepared as follows: Formaldehyde and urea are reacted at about 2 mol ratio. The proper amounts of formaldehyde and urea are dissolved in water to give a 50% to 55% solids content. The pH of the solution is adjusted to between 7 and 8 with 4 N sodium hydroxide, and the resulting solution is heated to about 100° C. At this point the pH of the solution is adjusted to about 4.5 to 5.5 by the addition of formic acid or ammonium acid phosphate, and the solution is heated at about 100° C. for about five to fifteen minutes until the viscosity of the solution is about 15 to 30 centipoises at 25° C. The pH is again adjusted to 7.5 to 8.5 with 4 N sodium hydroxide and the solution is cooled to ambient temperature.

The resulting aqueous resin is then quick-dried, preferably by spray drying, for periods of less than one minute and at solids temperatures below 130° C., preferably in the range of 80 to 100° C. Drying may take place either at atmospheric pressure or under vacuum. Short drying times of less than one minute, preferably between 10 and 40 seconds, and solids temperatures below 130° C. are critical in order to prevent product melting and degradation. Temperatures lower than about 60° C. are not desirable.

In the preferred method of drying the resin, i.e. spray drying using an atomizing disk, because of the evaporative cooling of inlet air, the temperature of the dry solid particle normally approaches but does not reach the temperature of the exit air. Therefore, exit air temperatures in the range of 85 to 105° C. are preferred. The temperature of inlet air may be 200° C. or higher, taking care always that the exit air temperature does not go above 130° C.

Dried resin prepared in the manner of this invention may be stored for at least six months, as mentioned heretofore, and is readily reconstituted into an aqueous resin solution by dissolving in water to a resin content of between about 45% and 65% by weight. For home insulation more urea is dissolved in the water with the resin to lower mol ratio of formaldehyde to urea to between 1.4 and 1.7 to 1.

Foam is produced with the reconstituted aqueous resin solution by conventional means. For example, foam may be produced by frothing an aqueous acidic hardener solution which is composed of 2% to 5% by weight of a surfactant such as Nacconal SZA (alkyl aryl sulfonic acids) and 0.5% to 6% by weight of acid, preferably a mineral acid such as sulfuric acid, and blending the reconstituted resin solution into the hardener froth by a suitable machine. Foam with densities from 0.2 to 0.8 pound per cubic foot is readily prepared by mixing the resin solution and foamed hardener solution in weight ratio between 0.5 and 2.3 parts of hardener per part of resin solution, and permitting the resultant mixture to harden and dry.

Additives may be mixed with the reconstituted resin solutions, if desired, to improve properties of the foam. For example, thiourea and glycols may be added to give a more resilient foam and furfuryl alcohol, in amounts between about 0.8% and about 8% by weight based on the urea-formaldehyde solids, may be added to render the foam flame-retardant.

This invention will be described further in conjunction with the following sepecific examples, but it is to be understood that these examples are merely illustrative and there is no intent to limit the invention thereto.

Example 1

An aqueous urea-formaldehyde resin solution was prepared by adding 308 parts of 37 wt. percent formaldehyde to a 50-gallon reactor. The pH was adjusted to 7.0 with 4 N sodium hydroxide and 110 parts of urea were dissolved in the formaldehyde. The liquid mixture was heated to 95° C. with agitation. The pH of the liquid was adjusted to about 5.3 with 1 molar monoammonium acid phosphate and the resulting mixture was maintained at about 100° C. until the viscosity, measured at 25° C., was about 25 centipoise. At the end of this time the pH was adjusted to about 7 with 4 N sodium hydroxide and the contents were cooled to 35° C. The pH was then adjusted to 7.5 with additional 4 N sodium hydroxide. The final viscosity measured at 25° C. was 29.5 centipoises.

The aqueous resin solution was spray dried in a 20-foot diameter flat bottom drier. Resin solution feed rate was about 800 pounds per hour with 200° C. inlet air temperature and 87° C. exit air temperature. A 7-inch diameter amomizing disk was used at 10,500 r.p.m. for spraying. Moisture of the solid product produced in the spray drier was less than 2%. The product formaldehyde/urea ratio was about 2.07. When a test portion of this solid product was reconstituted in water in the proportion 47 parts solids to 53 parts water the resultant aqueous solution had a viscosity of 30 centipoises at 25° C. and pH of 7.05. This solid product was found to be stable and could be stored for six months or longer without any substantial change.

After a storage period, the spray-dried solids was prepared for foaming by dissolving 47 parts of solids in 53 parts of water with agitation. Into this solution was blended 10.5 parts urea, 2.5 parts thiourea, 7.45 parts dipropylene glycol and 3.7 parts furfuryl alcohol. A foam was prepared from this resin solution mixed with a hardener solution containing 4.5 parts of Nacconol SZA, 0.56 part of 96% sulfuric acid and 94.94 parts water. The hardener solution and resin solution were blended in the ratio of 0.81/1, on a weight basis, and frothed with air in a foam machine. The resulting foam was used for filling the spaces between attic joists and wall studs in a house. The cured and dried foam showed very little shrinkage, as described in detail hereinafter.

Example 2

The procedure of Example 1 was repeated with the exception that a foam was prepared as follows: 36 parts of the aqueous hardener solution was whipped to a froth by using a Mix-Master type stirrer. When the froth was formed, 54 parts of aqueous resin prepared from the spray-dried resin was added and mixing continued an additional 20-30 seconds. The foam was allowed to cure at room temperature. A stable insulating foam was obtained having little shrinkage.

Example 3

The viscosity of aqueous resin solution prepared from spray-dried solids as described in Example 1 remained virtually unchanged after 141-days storage of the spray dried resin, whereas a sample of the original aqueous resin had a 127% increase in viscosity. This is shown in the following tabulation:

|  | Resin age, days | Viscosity, centipoise, 25° C. | pH |
|---|---|---|---|
| Original aqueous resin | 0 | 29.5 | 7.5 |
| Do | 141 | 68 | 7.35 |
| Reconstituted spray-dried resin | 141 | 30.5 | 7.15 |

Example 4

Foam prepared as described in Example 1 from the reconstituted spray-dried resin solution was compared in a test house with foam prepared from a resin solution different only in that the resin had not been spray dried. Shrinkage measurements were made between attic joists and wall studs. The spray-dried resin showed a significantly lower loss in insulating area as indicated by the following tabulation:

| Resin used | Attic shrinkage, width | | Wall shrinkage, width | | Wall shrinkage, length | |
|---|---|---|---|---|---|---|
|  | Linear, percent | Days | Linear, percent | Days | Linear, percent | Days |
| Spray dried resin | 3.64 | 41 | 1.8 | 42 | 1.51 | 42 |
| Undried resin | 6.5 | 43 | 3.0 | 42 | 1.95 | 42 |

Example 5

An aqueous urea-formaldehyde resin solution was prepared as follows: about 308 parts of 37 wt. percent formaldehyde were added to a 50-gallon reactor. The pH was adjusted to 7.0 with 4 N sodium hydroxide and 110 parts of urea were dissolved in the formaldehyde. The liquid mixture was heated to 95° C. with agitation. The pH of the liquid was adjusted to about 5.3 with 1 molar monoammonium acid phosphate and the resulting mixture was maintained at about 100° C. until the viscosity, measured at 25° C., was about 25 centipoises. At the end of this time the pH was adjusted to about 7 with 4 N sodium hydroxide and the contents were cooled to 35° C. The pH was then adjusted to 7.5 with additional 4 N sodium hydroxide. The final viscosity measured at 25° C. was 29.5 centipoises.

To 97 parts of this resin solution was added 3 parts of furfuryl alcohol and the mixture was spray dried in a 20-foot diameter flat bottom drier. Resin solution feed rate was about 800 pounds per hour with 204° C. inlet air temperature and 66° C. exit air temperature. A 7-inch diameter atomizing disk was used at 10,500 r.p.m. for spraying. Moisture of the solid product produced in the spray drier was less than 5%. The product formaldehyde/urea ratio was about 2.07. When a test portion of this solid product was reconstituted in water in the proportion 47 parts solids to 53 parts water the resultant aqueous solution had a viscosity of 30 centipoises at 25° C. and pH of 7.05. This solid product was found to be stable and could be stored for six months or longer without any substantial change.

After a storage period, the spray-dried solids was prepared for foaming by dissolving 47 parts of solids in 53 parts of water with agitation. Into this solution was blended 10.5 parts urea, 2.5 parts thiourea and 7.45 parts dipropylene glycol. A foam was prepared from this resin solution mixed with a hardener solution containing 4.5 parts of Nacconol SZA, 0.56 part of 96% sulfuric acid and 94.94 parts water. The hardener solution and resin solution were blended in the ratio of 0.81/1, on a weight basis, and frothed with air in a foam machine. The resulting foam was used for filling the spaces between attic joists and wall studs in a house. The cured and dried foam showed very little shrinkage.

What is claimed is:

1. A process for preparing a substantially nonshrinking, solid urea-formaldehyde foam which comprises (1) preparing an aqueous urea-formaldehyde resin solution having a urea-formaldehyde mol ratio between about 1 to 1.4 and about 1 to 2.2, and a urea-formaldehyde solids content between about 45% and about 65% by weight, (2) flash-drying the resultant resin solution for a period of less than one minute at a resin solids temperature less than 130° C., (3) dissolving the resultant dried resin in water in amount between about 45% and about 65% by weight, (4) preparing a hardener solution comprising an aqueous solution of between about 2% and about 5% of a foaming agent and between about 0.5% and about 6.0% of a strong acid, (5) mixing the hardener solution of step (4) and the resin solution of step (3) in a weight ratio of between about 0.5 part and about 2.3 parts hardener to resin, (6) forcing air through the resultant mixture to form a substantially homogeneous foam, and (7) curing the resultant foam.

2. A process for preparing a substantially nonshrinking, flame-retardant, solid urea-formaldehyde foam which comprises (1) preparing an aqueous urea-formaldehyde resin solution having a urea-formaldehyde mol ratio between about 1 to 1.4 and about 1 to 2.2, and a urea-formaldehyde solids content between about 45% and about 65% by weight, (2) mixing into the resultant resin solution between about 0.8% and about 8.0% by weight of furfuryl alcohol, based on the weight of said solids content, (3) flash-drying the resultant mixture for a period between about 10 seconds and about 40 seconds at a resin solids temperature between about 60° C. and about 100° C., (4) dissolving the resultant dried resin in water in amount between about 45% and about 65% by weight, (5) adding urea in amount sufficient to adjust the mol ratio of urea to formaldehyde to between about 1.4 and about 1.7, (6) preparing a hardener solution comprising an aqueous solution of between about 2% and about 5% of a foaming agent and between about 0.5% and about 6.0% of a strong acid, (7) mixing the hardener solution of step (6) and the resin solution of step (4) in a weight ratio between about 0.5 part and about 2.3 parts hardener to resin, (8) forcing air through the resultant mixture to form a substantially homogeneous foam, and (9) curing the resultant foam.

References Cited

UNITED STATES PATENTS

| | | |
|---|---|---|
| 2,076,295 | 4/1937 | Curs et al. |
| 2,559,891 | 7/1951 | Meyer. |
| 2,813,780 | 11/1957 | Vieli. |
| 2,970,120 | 1/1961 | Kreidl. |
| 3,006,871 | 10/1961 | Sunderland. |

FOREIGN PATENTS

| | | |
|---|---|---|
| 801,404 | 9/1958 | Great Britain. |

MURRAY TILLMAN, Primary Examiner

M. FOELAK, Assistant Examiner

U.S. Cl. X.R.

260—29.4, 70, 71